(12) United States Patent
Jung et al.

(10) Patent No.: US 8,860,671 B2
(45) Date of Patent: Oct. 14, 2014

(54) DEPRESSABLE TOUCH SENSOR

(75) Inventors: James Jung, San Jose, CA (US); Sang Chul Han, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 891 days.

(21) Appl. No.: 12/768,452

(22) Filed: Apr. 27, 2010

(65) Prior Publication Data

US 2010/0302153 A1     Dec. 2, 2010

Related U.S. Application Data

(60) Provisional application No. 61/181,888, filed on May 28, 2009, provisional application No. 61/253,944, filed on Oct. 22, 2009, provisional application No. 61/295,068, filed on Jan. 14, 2010.

(51) Int. Cl.
  *G06F 3/041*     (2006.01)
  *G06F 3/0354*    (2013.01)

(52) U.S. Cl.
  CPC .................. *G06F 3/03547* (2013.01)
  USPC ...................... 345/173; 178/18.01

(58) Field of Classification Search
  USPC ............. 345/173–178; 178/18.01, 18.03, 178/18.05–18.07
  See application file for complete search history.

(56) References Cited

U.S. PATENT DOCUMENTS

| | | | |
|---|---|---|---|
| 3,133,170 A | 5/1964 | Nanninga | |
| 5,327,161 A | 7/1994 | Logan et al. | |
| 5,374,787 A | 12/1994 | Miller et al. | |
| 5,463,195 A * | 10/1995 | Watanabe et al. | 200/5 A |
| 5,510,813 A | 4/1996 | Makinwa et al. | |
| 5,763,842 A | 6/1998 | Tsai et al. | |
| 5,799,772 A | 9/1998 | Sanda et al. | |
| 5,917,906 A | 6/1999 | Thornton | |
| 5,988,902 A | 11/1999 | Holehan | |
| 6,034,672 A | 3/2000 | Gaultier et al. | |
| 6,068,416 A * | 5/2000 | Kumamoto et al. | 400/491 |
| 6,512,625 B2 | 1/2003 | Mei et al. | |
| 6,590,565 B2 * | 7/2003 | Hosoya | 345/168 |
| 6,704,005 B2 | 3/2004 | Kato et al. | |
| 6,733,196 B2 | 5/2004 | Lee et al. | |
| 6,833,522 B1 | 12/2004 | Park et al. | |
| 7,502,013 B2 | 3/2009 | Nishino et al. | |
| 2002/0149571 A1 | 10/2002 | Roberts | |

(Continued)

FOREIGN PATENT DOCUMENTS

| WO | 2008138700 A1 | 11/2008 |
|---|---|---|
| WO | 2008151863 A1 | 12/2008 |
| WO | 2009014271 A2 | 1/2009 |

OTHER PUBLICATIONS

United States Patent and Trademark Office, Office Action for U.S. Appl. No. 12/729,969, dated Jun. 18, 2012.

(Continued)

*Primary Examiner* — Jason Mandeville
(74) *Attorney, Agent, or Firm* — Ingrassia Fisher & Lorenz P.C.

(57) ABSTRACT

An input device and a method for providing an input device are provided. The input device assembly includes a base, a sensor support, and a scissor mechanism attached to the base and the sensor support. The scissor mechanism allows for only substantially uniform translation of the sensor support towards the base in response to a force biasing the sensor support substantially towards the base.

19 Claims, 9 Drawing Sheets

(56) References Cited

U.S. PATENT DOCUMENTS

| | | |
|---|---|---|
| 2002/0180710 A1 | 12/2002 | Roberts |
| 2003/0025679 A1 | 2/2003 | Taylor et al. |
| 2003/0184517 A1 | 10/2003 | Senzui et al. |
| 2004/0108995 A1* | 6/2004 | Hoshino et al. ............... 345/173 |
| 2004/0125947 A1 | 7/2004 | Charlier et al. |
| 2004/0196268 A1* | 10/2004 | Hsu et al. ...................... 345/173 |
| 2004/0227736 A1 | 11/2004 | Kamrath et al. |
| 2005/0052425 A1 | 3/2005 | Zadesky et al. |
| 2005/0061082 A1 | 3/2005 | Dallenbach et al. |
| 2006/0267937 A1 | 11/2006 | Takatsuka et al. |
| 2007/0052691 A1 | 3/2007 | Zadesky et al. |
| 2007/0146348 A1 | 6/2007 | Villain |
| 2007/0152977 A1 | 7/2007 | Ng et al. |
| 2007/0236463 A1 | 10/2007 | Villain |
| 2008/0202824 A1 | 8/2008 | Philipp et al. |
| 2009/0009350 A1 | 1/2009 | Novak |
| 2009/0046068 A1 | 2/2009 | Griffin |
| 2009/0046070 A1 | 2/2009 | Griffin |
| 2009/0046071 A1 | 2/2009 | Griffin |
| 2009/0174679 A1 | 7/2009 | Westerman |
| 2011/0181542 A1 | 7/2011 | Yang |

OTHER PUBLICATIONS

International Search Report PCT/US2010/033894 dated Nov. 30, 2010.

United States Patent and Trademark Office, U.S. Final Office Action dated Nov. 21, 2012 for U.S. Appl. No. 12/729,969.

USPTO, Non-Final Office Action for U.S. Appl. No. 13/717,171 mailed Jul. 23, 2014.

* cited by examiner

DEPRESSABLE TOUCH SENSOR

This application claims priority of United States Provisional Patent Applications Ser. No. 61/181,888, which was filed on May 28, 2009, Ser. No. 61/253,944, which was filed on Oct. 22, 2009, and Ser. No. 61/295,068, which was filed on Jan. 14, 2010, and are incorporated herein by reference.

FIELD OF THE INVENTION

This invention generally relates to electronic devices, and more specifically relates to sensor devices and using sensor devices for producing user interface inputs.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic systems include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications, the proximity sensor device may function as a value adjustment device, cursor control device, selection device, scrolling device, graphics/character/handwriting input device, menu navigation device, gaming input device, button input device, keyboard and/or other input device. One common application for a proximity sensor device is as a touch screen. In a touch screen, the proximity sensor is combined with a display screen for displaying graphical and/or textual elements. Together, the proximity sensor and display screen function as the user interface.

In recent years, "click touchpad" or "click pad" technology has been developed which allows touchpads, touch screens, and other touch sensors to provide tactile feedback by being at least partially depressable or "clickable." The "click" may be purely for tactile feedback or may be used to generate a signal that is used by the electronic system in which the click pad is installed.

There is a continuing need for improvements in input devices, including those using click pad technology. In particular, there is a need for a robust and inexpensive input device assembly that allows for the use of click pad technology.

BRIEF SUMMARY OF THE INVENTION

The embodiments of the present invention provide a device and method that facilitates improved sensor device usability. Specifically, the device and method provide improved usability by facilitating the substantially uniform translation or depression of a sensor support in a "click touch pad" or "click pad" input device in a reliable and inexpensive manner.

In one embodiment, an input device assembly is provided. The input device assembly includes a base, touch sensor, and a scissor mechanism positioned between the base and the touch sensor. The scissor mechanism includes a first arm and a second arm. The first arm has first and second end portions and first and second side portions interconnecting the first and second end portions. The first end portion of the first arm is rotatably mounted to one of the base and the touch sensor. The second end portion of the first arm is slidable relative to the other of the base and the touch sensor. The first and second end portions of the first arm are separated by a first distance. The second arm is rotatably coupled to and positioned between the first and second side portions of the first arm. The second arm has first and second end portions. The first end portion of the second arm is rotatably mounted to one of the base and the touch sensor. The second end portion of the first arm is slidable relative to the other of the base and the touch sensor. The first and second end portions of the second arm are separated by a second distance. The second distance is less than the first distance. Deflection of the touch sensor causes the first end portion of the first arm to rotate relative to the one of the base and the touch sensor, the second end portion of the first arm to slide relative to the other of the base and the touch sensor, the first end portion of the second arm to rotate relative to the one of the base and the touch sensor, the second end portion of the second arm to slide relative to the other of the base and the touch sensor, and actuation of a switch.

In another embodiment, an input device assembly is provided. The input device assembly includes a base, a touch sensor, a switch positioned between the base and the touch sensor, and a scissor mechanism positioned between the base and the touch sensor. The scissor mechanism includes a first arm and a second arm. The first arm has first and second end portions and first and second side portions interconnecting the first and second end portions. The first end portion of the first arm is rotatably mounted to one of the base and the touch sensor. The second end portion of the first arm is slidable relative to the other of the base and the touch sensor. The first and second end portions of the first arm are separated by a first distance. The second arm includes first and second end portions and first and second side portions interconnecting the first and second end portions. The first side portion of the second arm is rotatably coupled to the first side portion of the first arm. The second side portion of the second arm is rotatably coupled to the second side portion of the first arm. The first and second side portions of the second arm are positioned between the first and second side portions of the first arm. The first end portion of the second arm is rotatably mounted to one of the base and the touch sensor. The second end portion of the first arm is slidable relative to the other of the base and the touch sensor. The first and second end portions of the second arm are separated by a second distance. The second distance is less than the first distance. Deflection of the touch sensor causes the first end portion of the first arm to rotate relative to the one of the base and the touch sensor, the second end portion of the first arm to slide relative to the other of the base and the touch sensor, the first end portion of the second arm to rotate relative to the one of the base and the touch sensor, the second end portion of the second arm to slide relative to the other of the base and the touch sensor, and actuation of the switch. The first and second arms of the scissor mechanism are sized and shaped such that sufficient deflection of the touch sensor causes the first and second end potions of the second arm to be positioned directly between the first and second end portions of the first arm.

In a further embodiment, a method of providing an input device assembly is provided. A base and a touch sensor are provided. The base and the touch sensor are interconnected with a scissor mechanism positioned between the base and the touch sensor. The scissor mechanism includes a first arm and a second arm. The first arm has first and second end portions and first and second side portions interconnecting the first and second end portions. The first end portion of the first arm is rotatably mounted to one of the base and the touch sensor. The second end portion of the first arm is slidable relative to the other of the base and the touch sensor. The first and second end portions of the first arm are separated by a first distance. The second arm is rotatably coupled to and positioned between the first and second side portions of the first arm. The second arm has first and second end portions. The first end portion of the second arm is rotatably mounted to one of the base and the touch sensor. The second end portion of the first arm is slidable relative to the other of the base and the touch sensor. The first and second end portions of the second arm are separated by a second distance. The second distance being less than the first distance. Deflection of the touch sensor causes the first end portion of the first arm to rotate relative to the one of the base and the touch sensor, the second end portion of the first arm to slide relative to the other of the base and the touch sensor, the first end portion of the second arm to rotate relative to the one of the base and the touch sensor, the second end portion of the second arm to slide relative to the other of the base and the touch sensor, and actuation of a switch.

BRIEF DESCRIPTION OF DRAWINGS

The preferred exemplary embodiment of the present invention will hereinafter be described in conjunction with the appended drawings, where like designations denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various aspects of the present invention provide input devices and methods that facilitate improved usability. Specifically, the input devices and methods relate user input to the input devices and resulting actions on displays. As one example, user input in sensing regions of the input devices and methods of processing the user input allow users to interact with electronic systems, thus providing more enjoyable user experiences and improved performance.

Figure 1:
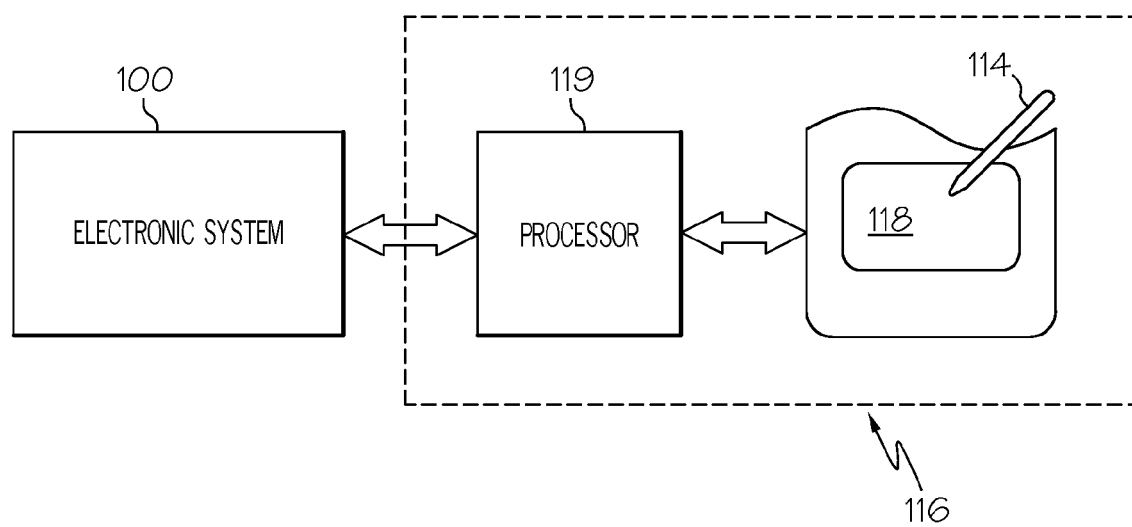
FIG. 1 is a block diagram of an exemplary system that includes an input device in accordance with an embodiment of the invention.

Turning now to the figures, FIG. 1 is a block diagram of an exemplary electronic system 100 that is coupled to an input device 116, shown as a proximity sensor device (also often referred to as a touch pad, a touch sensor, or a "click pad"). As used in this document, the terms "electronic system" and "electronic device" broadly refers to any type of system capable of processing information. An input device associated with an electronic system can be implemented as part of the electronic system, or coupled to the electronic system using any suitable technique. As a non-limiting example, the electronic system may comprise another input device (such as a physical keypad or another touch sensor device). Additional non-limiting examples of the electronic system include personal computers such as desktop computers, laptop computers, portable computers, workstations, personal digital assistants, video game machines. Examples of the electronic system also include communication devices such as wireless phones, pagers, and other messaging devices. Other examples of the electronic system include media devices that record and/or play various forms of media, including televisions, cable boxes, music players, digital photo frames, video players, digital cameras, video camera. In some cases, the electronic system is peripheral to a larger system. For example, the electronic system could be a data input device such as a remote control, or a data output device such as a display system, that communicates with a computing system using a suitable wired or wireless technique.

The elements communicatively coupled to the electronic system, and the parts of the electronic system, may communicate via any combination of buses, networks, and other wired or wireless interconnections. For example, an input device may be in operable communication with its associated electronic system through any type of interface or connection. To list several non-limiting examples, available interfaces and connections include $I^2C$, SPI, PS/2, Universal Serial Bus (USB), Bluetooth, RF, IRDA, and any other type of wired or wireless connection.

The various elements (e.g. processors, memory, etc.) of the electronic system may be implemented as part of the input device associated with it, as part of a larger system, or as a combination thereof. Additionally, the electronic system could be a host or a slave to the input device. Accordingly, the various embodiments of the electronic system may include any type of processor, memory, or display, as needed.

Returning now to FIG. 1, the input device 116 includes a sensing region 118. The input device 116 is sensitive to input by one or more input objects (e.g. fingers, styli, etc.), such as the position of an input object 114 within the sensing region 118. "Sensing region" as used herein is intended to broadly encompass any space above, around, in and/or near the input device in which sensor(s) of the input device is able to detect user input. In a conventional embodiment, the sensing region of an input device extends from a surface of the sensor of the input device in one or more directions into space until signal-to-noise ratios prevent sufficiently accurate object detection. The distance to which this sensing region extends in a particular direction may be on the order of less than a millimeter, millimeters, centimeters, or more, and may vary significantly with the type of sensing technology used and the accuracy desired. Thus, embodiments may require contact with the surface, either with or without applied pressure, while others do not. Accordingly, the sizes, shapes, and locations of particular sensing regions may vary widely from embodiment to embodiment.

Sensing regions with rectangular two-dimensional projected shape are common, and many other shapes are possible. For example, depending on the design of the sensor array and surrounding circuitry, shielding from any input objects, and the like, sensing regions may be made to have two-dimensional projections of other shapes. Similar approaches may be used to define the three-dimensional shape of the sensing region. For example, any combination of sensor design, shielding, signal manipulation, and the like may effectively define a sensing region 118 that extends some distance into or out of the page in FIG. 1.

In operation, the input device 116 suitably detects one or more input objects (e.g. the input object 114) within the sensing region 118. The input device 116 thus includes a sensor (not shown) that utilizes any combination sensor components and sensing technologies to implement one or more sensing regions (e.g. sensing region 118) and detect user input such as presences of object(s). Input devices may include any number of structures, such as one or more sensor electrodes, one or more other electrodes, or other structures adapted to detect object presence. As several non-limiting examples, input devices may use capacitive, resistive, inductive, surface acoustic wave, and/or optical techniques. Many of these techniques are advantageous to ones requiring moving mechanical structures (e.g. mechanical switches) as they may have a substantially longer usable life.

For example, sensor(s) of the input device 116 may use arrays or other patterns of capacitive sensor electrodes to support any number of sensing regions 118. As another example, the sensor may use capacitive sensing technology in combination with resistive sensing technology to support the same sensing region or different sensing regions. Examples of the types of technologies that may be used to implement the various embodiments of the invention may be found in U.S. Pat. Nos. 5,543,591, 5,648,642, 5,815,091, 5,841,078, and 6,249,234.

In some resistive implementations of input devices, a flexible and conductive top layer is separated by one or more spacer elements from a conductive bottom layer. A voltage gradient is created across the layers. Pressing the flexible top layer in such implementations generally deflects it sufficiently to create electrical contact between the top and bottom layers. These resistive input devices then detect the position of an input object by detecting the voltage output due to the relative resistances between driving electrodes at the point of contact of the object.

In some inductive implementations of input devices, the sensor picks up loop currents induced by a resonating coil or pair of coils, and use some combination of the magnitude, phase and/or frequency to determine distance, orientation or position.

In some capacitive implementations of input devices, a voltage is applied to create an electric field across a sensing surface. These capacitive input devices detect the position of an object by detecting changes in capacitance caused by the changes in the electric field due to the object. The sensor may detect changes in voltage, current, or the like.

As an example, some capacitive implementations utilize resistive sheets, which may be uniformly resistive. The resistive sheets are electrically (usually ohmically) coupled to electrodes that receive from the resistive sheet. In some embodiments, these electrodes may be located at corners of the resistive sheet, provide current to the resistive sheet, and detect current drawn away by input devices via capacitive coupling to the resistive sheet. In other embodiments, these electrodes are located at other areas of the resistive sheet, and drive or receive other forms of electrical signals. Depending on the implementation, sometimes the sensor electrodes are considered to be the resistive sheets, the electrodes coupled to the resistive sheets, or the combinations of electrodes and resistive sheets.

As another example, some capacitive implementations utilize transcapacitive sensing methods based on the capacitive coupling between sensor electrodes. Transcapacitive sensing methods are sometimes also referred to as "mutual capacitance sensing methods." In one embodiment, a transcapacitive sensing method operates by detecting the electric field coupling one or more transmitting electrodes with one or more receiving electrodes. Proximate objects may cause changes in the electric field, and produce detectable changes in the transcapacitive coupling. Sensor electrodes may transmit as well as receive, either simultaneously or in a time multiplexed manner. Sensor electrodes that transmit are sometimes referred to as the "transmitting sensor electrodes," "driving sensor electrodes," "transmitters," or "drivers"—at least for the duration when they are transmitting. Other names may also be used, including contractions or combinations of the earlier names (e.g. "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names. In one embodiment, a transmitting sensor electrode is modulated relative to a system ground to facilitate transmission. In another embodiment, a receiving sensor electrode is not modulated relative to system ground to facilitate receipt.

In FIG. 1, the processing system (or "processor") 119 is coupled to the input device 116 and the electronic system 100. Processing systems such as the processing system 119 may perform a variety of processes on the signals received from the sensor(s) of input devices such as the input device 116. For example, processing systems may select or couple individual sensor electrodes, detect presence/proximity, calculate position or motion information, or interpret object motion as gestures. Processing systems may also determine when certain types or combinations of object motions occur in sensing regions.

The processing system 119 may provide electrical or electronic indicia based on positional information of input objects (e.g. input object 114) to the electronic system 100. In some embodiments, input devices use associated processing systems to provide electronic indicia of positional information to electronic systems, and the electronic systems process the indicia to act on inputs from users. One example system responses is moving a cursor or other object on a display, and the indicia may be processed for any other purpose. In such embodiments, a processing system may report positional information to the electronic system constantly, when a threshold is reached, in response criterion such as an identified stroke of object motion, or based on any number and variety of criteria. In some other embodiments, processing systems may directly process the indicia to accept inputs from the user, and cause changes on displays or some other actions without interacting with any external processors.

In this specification, the term "processing system" is defined to include one or more processing elements that are adapted to perform the recited operations. Thus, a processing system (e.g. the processing system 119) may comprise all or part of one or more integrated circuits, firmware code, and/or software code that receive electrical signals from the sensor and communicate with its associated electronic system (e.g. the electronic system 100). In some embodiments, all processing elements that comprise a processing system are located together, in or near an associated input device. In other embodiments, the elements of a processing system may be physically separated, with some elements close to an associated input device, and some elements elsewhere (such as near other circuitry for the electronic system). In this latter embodiment, minimal processing may be performed by the processing system elements near the input device, and the majority of the processing may be performed by the elements elsewhere, or vice versa.

Furthermore, a processing system (e.g. the processing system 119) may be physically separate from the part of the electronic system (e.g. the electronic system 100) that it communicates with, or the processing system may be implemented integrally with that part of the electronic system. For example, a processing system may reside at least partially on one or more integrated circuits designed to perform other functions for the electronic system aside from implementing the input device.

In some embodiments, the input device is implemented with other input functionality in addition to any sensing regions. For example, the input device 116 of FIG. 1 may be implemented with buttons or other input devices near the sensing region 118. The buttons may be used to facilitate selection of items using the proximity sensor device, to provide redundant functionality to the sensing region, or to provide some other functionality or non-functional aesthetic effect. Buttons form just one example of how additional input functionality may be added to the input device 116. In other implementations, input devices such as the input device 116 may include alternate or additional input devices, such as physical or virtual switches, or additional sensing regions. Conversely, in various embodiments, the input device may be implemented with only sensing region input functionality.

Likewise, any positional information determined a processing system may be any suitable indicia of object presence. For example, processing systems may be implemented to determine "zero-dimensional" 1-bit positional information (e.g. near/far or contact/no contact) or "one-dimensional" positional information as a scalar (e.g. position or motion along a sensing region). Processing systems may also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing systems may also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, positional information from processing systems may be used to facilitate a full range of interface inputs, including use of the proximity sensor device as a pointing device for cursor control, scrolling, and other functions.

In some embodiments, an input device such as the input device 116 may be adapted as part of a touch screen interface. Specifically, a display screen is overlapped by at least a portion of a sensing region of the input device, such as the sensing region 118. Together, the input device and the display screen provide a touch screen for interfacing with an associated electronic system. The display screen may be any type of electronic display capable of displaying a visual interface to a user, and may include any type of LED (including organic LED (OLED)), CRT, LCD, plasma, EL or other display technology. When so implemented, the input devices may be used to activate functions on the electronic systems. In some embodiments, touch screen implementations allow users to select functions by placing one or more objects in the sensing region proximate an icon or other user interface element indicative of the functions. The input devices may be used to facilitate other user interface interactions, such as scrolling, panning, menu navigation, cursor control, parameter adjustments, and the like. The input devices and display screens of touch screen implementations may share physical elements extensively. For example, some display and sensing technologies may utilize some of the same electrical components for displaying and sensing.

It should be understood that while many embodiments of the invention are to be described herein the context of a fully functioning apparatus, the mechanisms of the present invention are capable of being distributed as a program product in a variety of forms. For example, the mechanisms of the present invention may be implemented and distributed as a sensor program on computer-readable media. Additionally, the embodiments of the present invention apply equally regardless of the particular type of computer-readable medium used to carry out the distribution. Examples of computer-readable media include various discs, memory sticks, memory cards, memory modules, and the like. Computer-readable media may be based on flash, optical, magnetic, holographic, or any other storage technology.

In one embodiment, the input device 116 utilizes "click pad" technology. The touch sensor(s) used may be based on any type of touch-related technology, including resistive, capacitive, inductive, surface acoustic wave (SAW), optical, and the like. The depressing of the touch sensor, or the "click," may be purely for tactile feedback. However, in the depicted embodiment described below, the click provides input information used to provide other responses in the electronic system 100. For example, the click may involve actuation of a binary or multi-stage switch, change a reading of a digital or analog force sensor, change a reading of a displacement sensor, or the like. The response to the switch actuation or force change can be non-varying or variable. Examples of non-varying responses include selection, emulation of specific mouse button clicks, confirmation of a command, and the like. Variable responses may be dependent on context such as which window is active in an associated GUI, which software application is active, which function is active, options then available to the user, the amount of force or displacement sensed, displays shown, position(s) of one or more input objects in the sensing region of the touch sensor, a combination thereof, or the like. The click pad may be integral or peripheral to computing devices, including terminals, desktops, laptops, PDAs, cell phones, remote controls, etc. The click pad may communicate via any wired or wireless protocols.

Examples of switches that may be used include snap dome buttons (which may be enabled with a Belleville spring or some other mechanism) and various types of microswitches. The switches may be binary or have multiple positions or switch levels. Any variety of switch technology, including electrical contact, resistive, or capacitive, may be used.

Examples of other sensors (aside from switches) include force sensors (e.g. strain gauges) or displacement sensors (e.g. linear position sensors). These sensors may supply finer resolution information. Finer resolution information may be used to provide multiple different levels of actuation (even continuous changes akin to analog readings) for controlling various parameters (e.g. volume, speed, etc). For force sensors, the force sensed may not be the applied force (since the force transmitted to sensor may be a fraction or an amplification of the applied force, depending on the click pad design and potentially the location(s) of the input(s)). Since the touch sensor may be used to supply input location information, the actual force applied may be determined using the force reading as well as the location(s) of the input.

In some embodiments, sensors such as switches may be placed behind a touch sensor that is constrained in some way to move substantially repeatably in response to force applied to the touch sensor. For example, the substrate may be constrained to translate, rotate, or translate and rotate in such a way that it can activate the switch (or other sensor) used.

Some embodiments may implement keypads using touch sensors. A keypad may be demarked by a dynamic display (e.g. an LCD) or statically imprinted on a surface of the touch sensor device. In response to user pressure applied on the surface, the associated touch sensor may relay the location(s) of the user input to a host processor that determines which key(s) should be activated in response. Criteria such as a minimum amount of force or a minimum duration of user contact may be applied to qualify the actuation. The system may respond to the activated key by passing the key information to another system or another part of the system, by entering the associated input (e.g. a letter, number, or function), by displaying visual feedback, or by taking any other appropriate action (e.g. by dialing a phone number if the keypad is that of a phone).

Motion of the touch sensor may be implemented in various ways. For example, the system may be designed to provide substantially uniform translation in response to actuation force applied to different locations across a surface of the touch sensor. A linear slide may be used to constrain the motion of the substrate such that the substrate does not tilt, twist, or slide (e.g. toward actuation of a switch or interaction with a force or displacement sensor).

Figure 2:
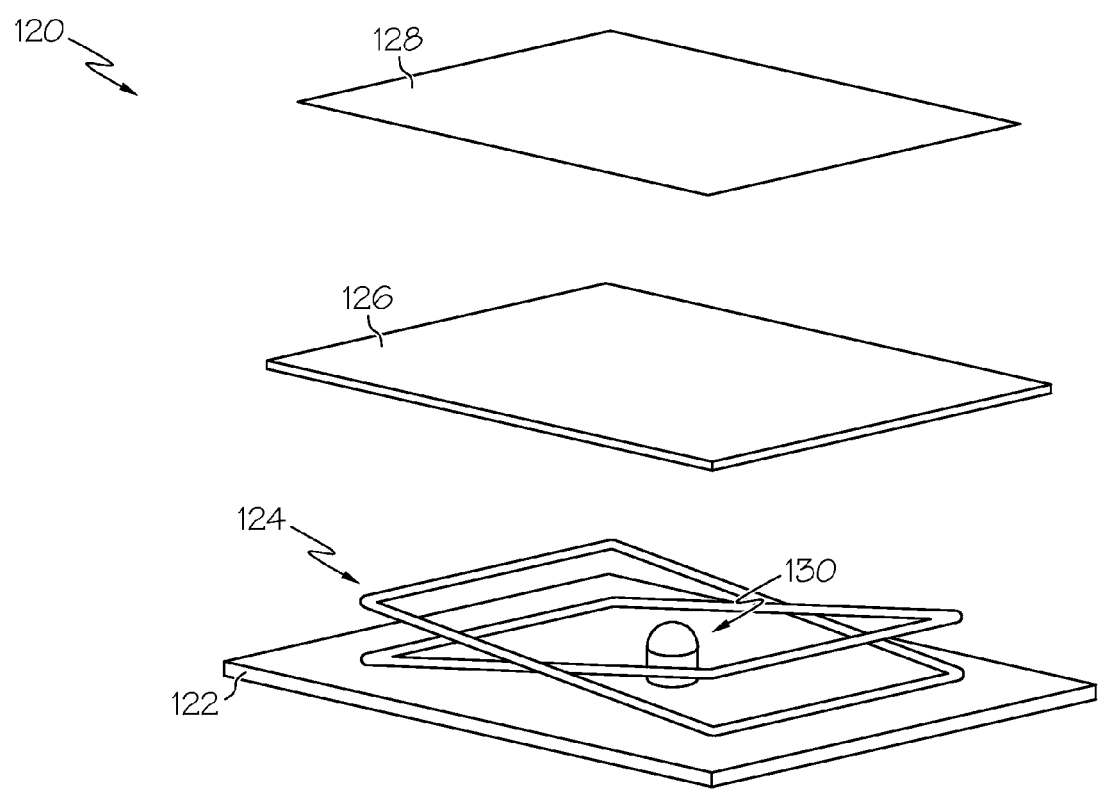
FIG. 2 is an exploded isometric view of an exemplary input device in accordance with an embodiment of the invention.

FIG. 2 illustrates, in an exploded manner, an exemplary input device assembly 120 which utilizes "click touchpad" or "click pad" technology and may be implemented in the input device 116. The input device assembly 120 includes a base (or lower bracket) 122, a scissor or guide mechanism (or assembly) 124, a sensor support 126, and a touch sensor (e.g., a capacitive touch sensor) 128. As shown, all of the components of the input device assembly 120 are substantially rectangular and arranged such that the scissor mechanism 124 is positioned between (and interconnects) the base 122 and the sensor support 126 and the touch sensor 128 is positioned over the sensor support 126. The base 122 and the sensor support 126 may be made of a metal, a composite, or plastic. The input device assembly 120 further includes a switch (e.g., a snap dome button) 130 connected to a central portion of the base 122 on a side adjacent to the scissor mechanism 124. Although not shown, the input device assembly 120 may also include an upper bracket arranged around a periphery of the touch sensor 128, a cover sheet (e.g., made of Mylar) over the touch sensor 128, and various adhesive layers or films.

Figure 3:
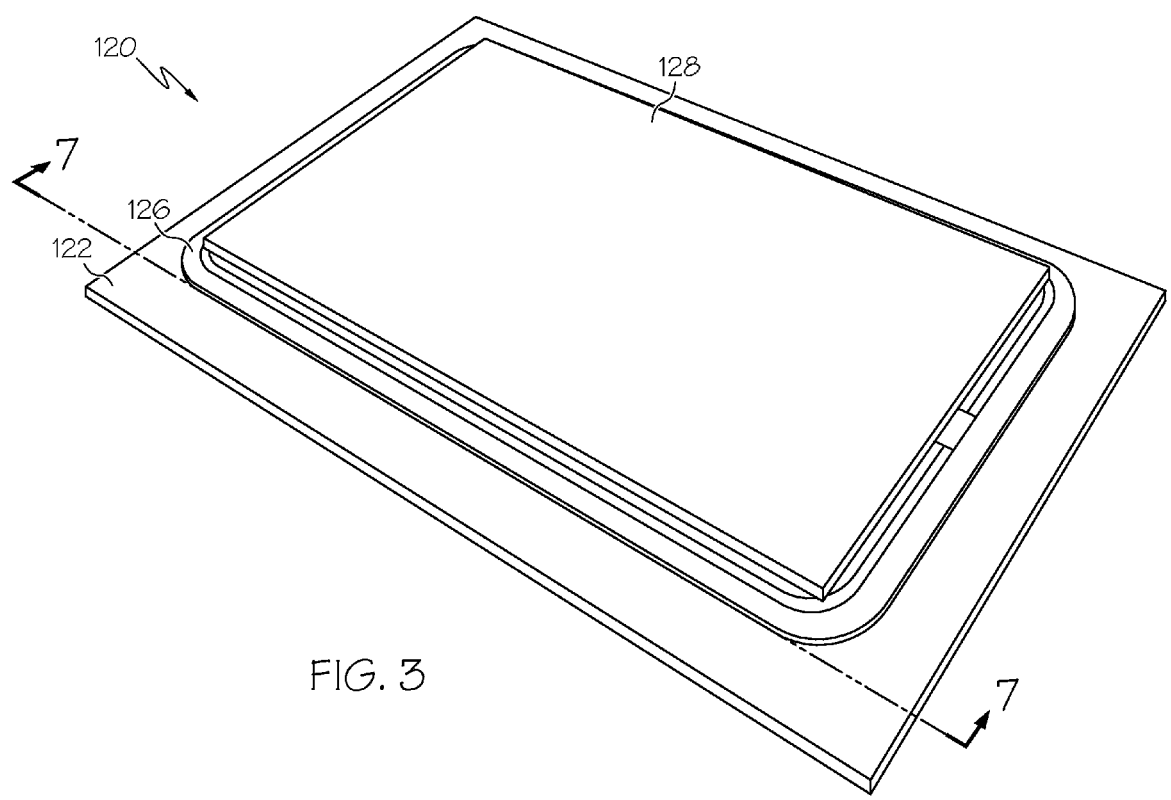
FIG. 3 is an isometric view of the input device of FIG. 2.
Figure 4:
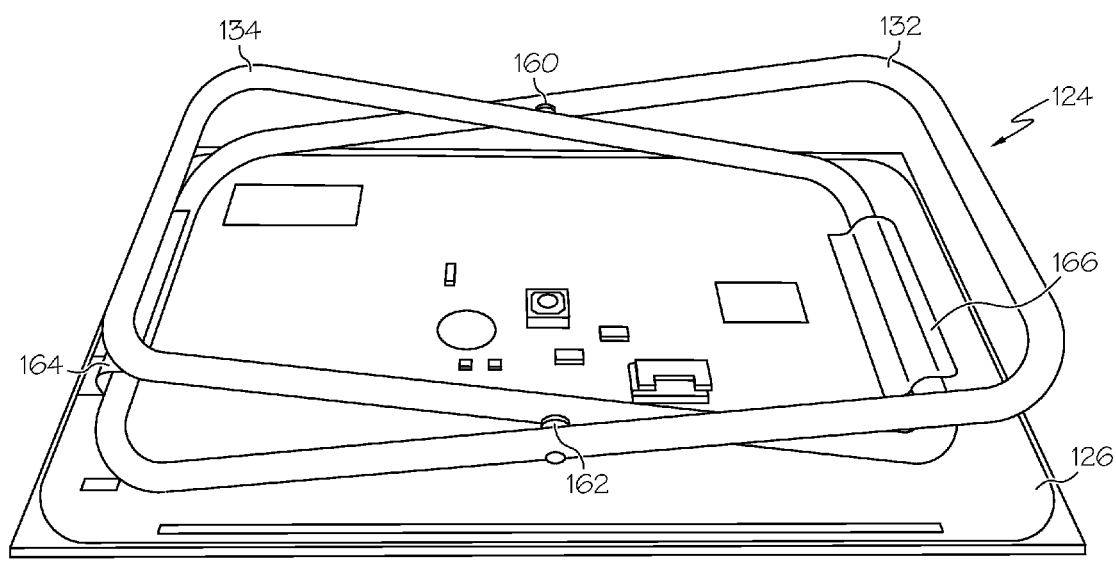
FIG. 4 is an isometric view of a bottom of a sensor support and a scissor mechanism within the input device of FIG. 2.
Figure 5:
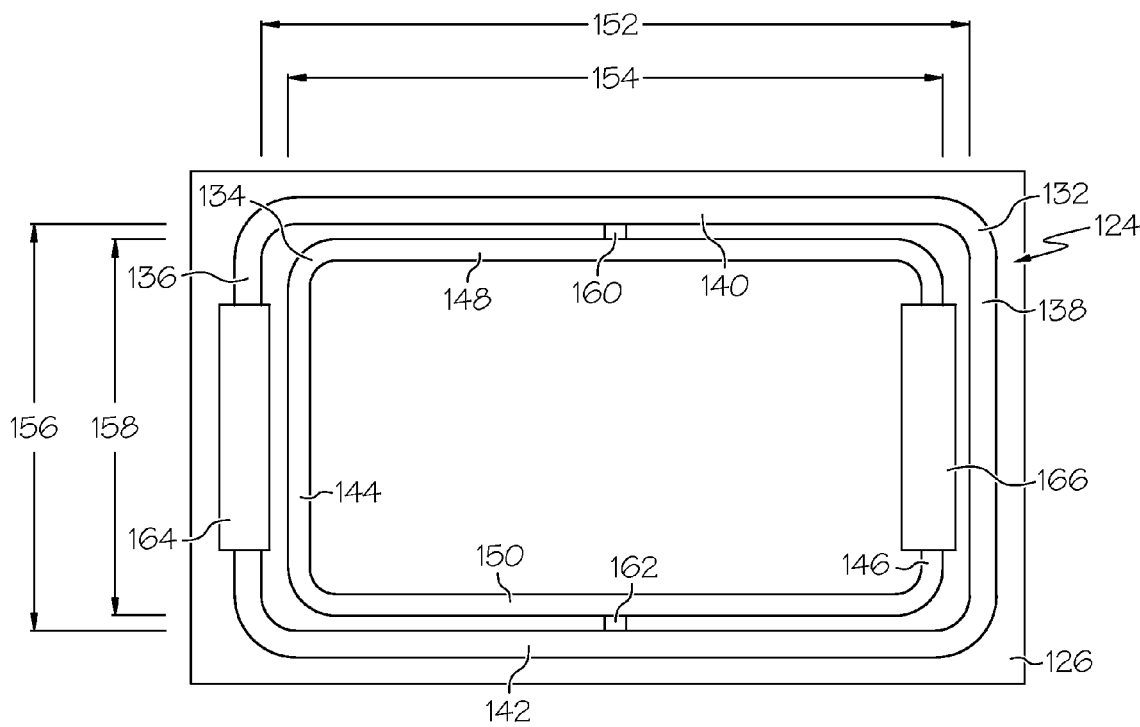
FIG. 5 is a plan view of the sensor support and the scissor mechanism of FIG. 4.

FIGS. 3, 4, and 5 illustrates the input device assembly 120 partially assembled. As shown in FIG. 3, the touch sensor 128 is centered on and mounted to the sensor support 126. As described below, the scissor mechanism 124 is positioned between and connected to the base 122 and the sensor support 126 (and/or the touch sensor 128).

FIGS. 4 and 5 illustrate a lower surface (or bottom) of the sensor support 126 and the scissor mechanism 124. The scissor mechanism 124 includes a first arm 132 and a second arm 134. In the depicted example, the first and second arms 132 and 134 are substantially rectangular in shape and constructed from wire-like pieces of metal (e.g., steel or aluminum). The first arm 132 includes end portions 136 and 138 and side portions 140 and 142, which interconnect the end portions 136 and 138. Likewise, the second arm includes end portions 144 and 146 and side portions 148 and 150. It should be understood that the descriptors used for the end portions and side portions of the arms of the scissor mechanism 124 may be interchanged. It should also be understood that the first and second arms 132 and 134 may be made of other materials, such as other metals, composite materials, and plastics, and may be in different shapes, such as squares and other polygons.

As shown in FIG. 5, the side portions 148 and 150 of the second arm 134 are positioned between the side portions 140 and 142 of the first arm 132, and the first and second arms 132 and 134 are sized such that the first arm 132 is large enough to completely surround the second arm 134. More specifically, a distance 152 between the inner edges of the end portions 136 and 138 of the firm arm 132 is greater than a distance 154 between (the outer edges of) the end portions 144 and 146 of the second arm 134. Similarly, a distance 156 between (the inner edges) of the side portions 140 and 142 of the first arm 132 is greater than a distance 158 between (the outer edges of) the side portions 148 and 150 of the second arm 134. It should be noted that in the depicted embodiment, the distances 152-156 substantially correspond to the lengths and/or widths of the first and second arms 132 and 134 and that the lengths and/or widths of the first and second arms 132 and 134 extend substantially the entire length and/or width of the sensor support 126.

Additionally, it should be noted that the scissor mechanism 124 does not increase the "footprint" (i.e., lateral surface area covered) of the input device assembly 120. That is, the scissor mechanism 124 is sized and arranged relative to the base 122, the sensor support 126, and the touch sensor 128 such that the scissor mechanism 124 is contained within the outermost perimeter of the other components. In the example shown, the footprint of the input device assembly 120 is defined solely by the base 122, as the base 122 extends laterally farther than the other components in all directions.

Still referring to FIGS. 4 and 5, the first and second arms 132 and 134 are rotatably attached (or coupled) at pivots, or at pivot points, (and/or by pivot pins) 160 and 162. More specifically, pivot pin 160 interconnects side portion 140 of the first arm 132 with side portion 148 of the second arm 134, and pivot pin 162 interconnects side portion 142 of the first arm 132 with side portion 150 of the second arm 134. It should be noted that the pivot points (or pins) 160 and 162 are not located equidistantly from the end portions of the first and second arms 132 and 134. In the depicted embodiment, the pivot points 160 and 162 are closer to end portions 138 and 146 than they are to end portions 136 and 144. However, in other embodiments, the pivots points 160 may be equidistant from the end portions of the first and second arms 132 and 134 (i.e., the pivot points may be positioned at the center of the side portions 140, 142, 148, and 150 of the first and second arms 132 and 134).

Further referring to FIGS. 4 and 5, end portion 136 of the first arm 132 is connected to the sensor support 126 by pivot bracket 164 (described in greater detail below), and end portion 146 of the second arm 134 is connected to the sensor support 126 by slide bracket 166 (described in greater detail below).

Figure 6:
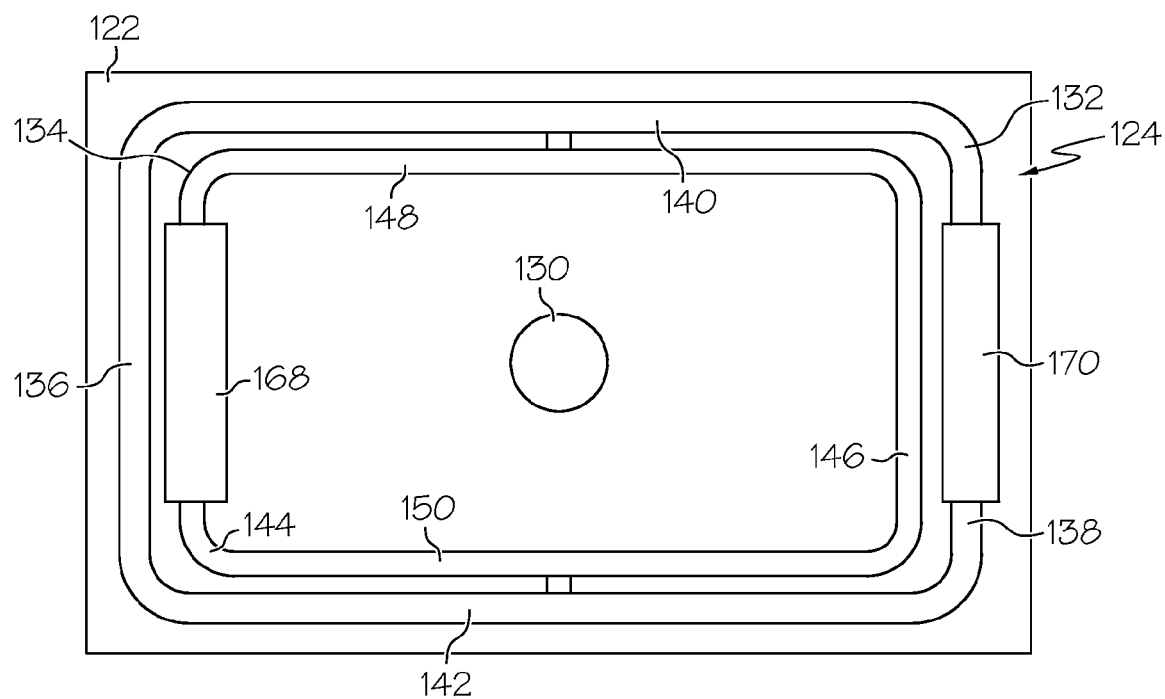
FIG. 6 is a plan view of a base of the input device of FIG. 2 and the scissor mechanism.

FIG. 6 illustrates the base 122 and the scissor mechanism 124. As shown, the switch 130 is positioned between the opposing end and side portions of the first and second arms 132 and 134. That is, the first and second arms 132 and 134 surround or circumscribe the switch 130. End portion 144 of the second arm 134 is connected to the base 122 by pivot bracket 168, and end portion 138 of the first arm 132 is connected to the base 122 by slide bracket 170.

In one embodiment, the brackets 164, 166, 168 and 170 are made of steel. However, other materials, such as other metals, composites, and plastics may be used. The brackets 164, 166, 168, and 170 may be affixed to the base 122 and the sensor support 126 using, for example, rivets, screws, welding, laser welding, caulking (or a caulking joint), adhesive (e.g., glue), or any combination thereof.

Figure 7:
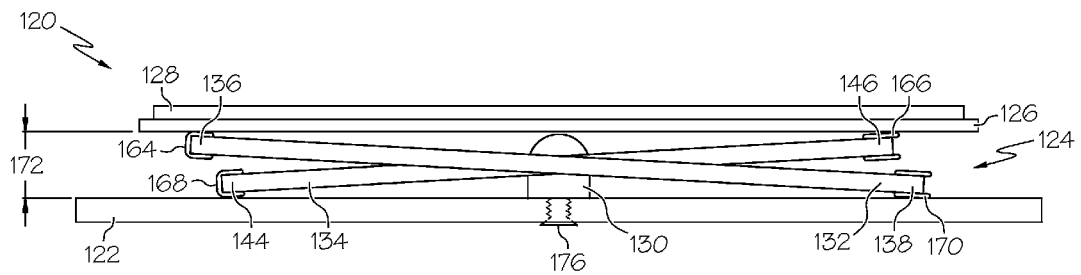
FIGS. 7 and 8 are side views of the input device taken along line 7-7 in FIG. 3.

Referring now to FIG. 7, as such, adjacent end portions 136 and 144 (i.e., the end portions on one side of the switch 130) are connected to the sensor support 126 and the base 122, respectively, by pivot brackets 164 and 168. While end portions 138 and 146 (i.e., the end portions on the other side of the switch 130) are connected to the base 122 and the sensor support 126, respectively, by slide brackets 166 and 170.

Still referring to FIG. 7, when the input device assembly 120 is assembled, the switch 130, or a spring-like mechanism within the switch 130 (e.g., a Belleville spring), applies an "upwards" force to the sensor support 126 (i.e., away from the base 122). In some embodiments, the switch 130 may be the only source for this upwards force applied to the sensor support 126. However, in other embodiments, the scissor mechanism 124 may include a spring-like mechanism (not shown) coupled to the first and second arms 132 and 134, which causes the scissor mechanism 124 itself to apply a force to the sensor support 126 (i.e., solely or in combination withy the switch 130) in a manner similar to that of the switch 130 as described above.

The connections between the scissor mechanism 124, the base 122, and the sensor support 126 causes the arms 132 and 134 of the scissor mechanism 124 to be arranged in the "crossed" or "expanded" configuration shown in FIG. 7 which lifts the sensor support 126 (and the touch sensor 128) away from the base 122. When not depressed, the sensor support may be suspended a first height 172 above the base 122. The first height may be, for example, between 1.0 and 3.0 mm.

In normal operation, the touch sensor 128 is used to receive user input in the manner described above. To use the "click pad" functionality, the user simply applies a force onto, or into, the touch sensor 128, using the input object 114 (e.g., a finger or a stylus).

Figure 8:
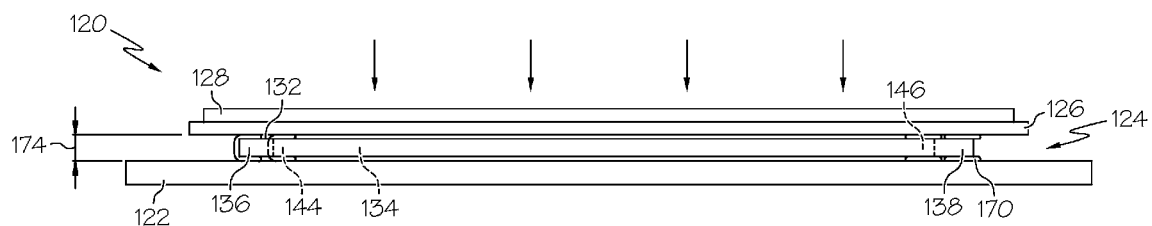
Figure 9:
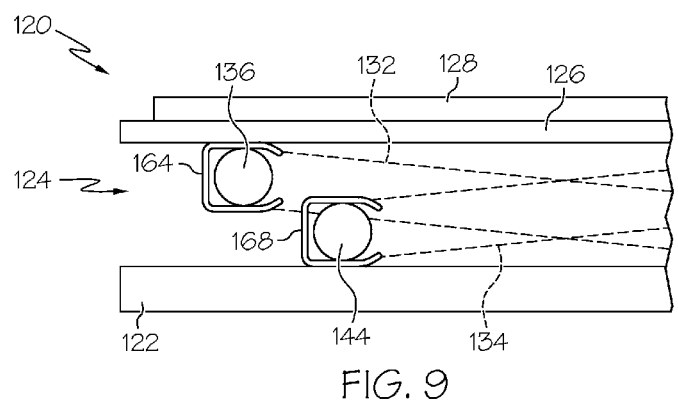
FIGS. 9, 10, 11, and 12 are cross-sectional view of the input device of FIGS. 7 and 8.

Referring to FIGS. 7, 8, and 9, the force applied by the user causes the sensor support 126 to move towards the base while the switch 130 (and/or the scissor mechanism 124) applies a force that opposes the movement of the sensor support 126. When the sensor support 126 is moved towards the base 122 by an actuation distance, the switch 130 is actuated to the point where it, in accordance with normal operation, generates a suitable signal which is sent to the processor 119 (FIG. 1). That is, the switch is "activated." The particular magnitude of the actuation distance is dependent on how much "travel" the switch 130 has (i.e., how much actuation is needed to activate the switch), the position of the switch 130 relative to the base 122. In one embodiment, the switch 130 is connected to the base 122 via an adjustment mechanism 176 (e.g., a screw) which allows the switch 130 to be raised and lowered relative to the base 122. As such, the actuation distance may be adjusted by utilizing a particular kind of switch and tuning the position of the switch with the adjustment mechanism 176. In some embodiments, the activation of the switch provides a particular tactile feel to the user by, for example, providing a different amount of resistance to further actuating the switch 130. The activation of the switch 130 may also be accompanied by an audible sound, such as a "click."

Figure 10:
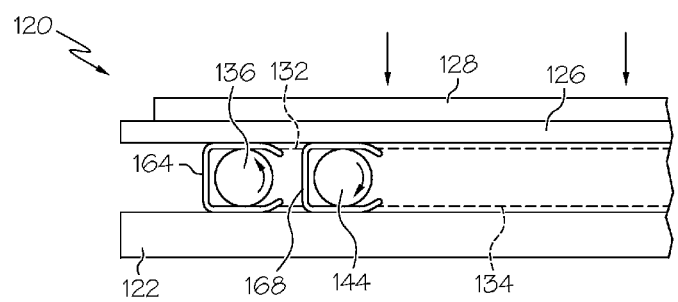
Figure 11:
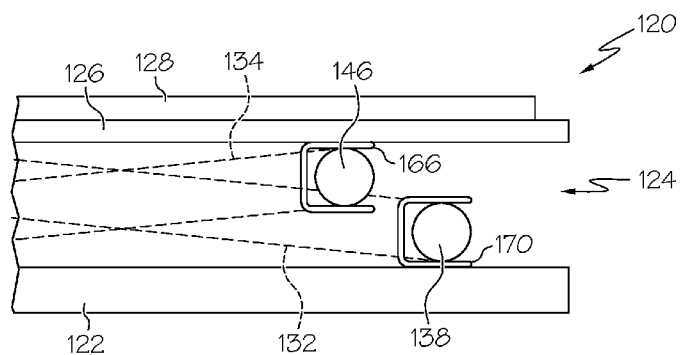
Figure 12:
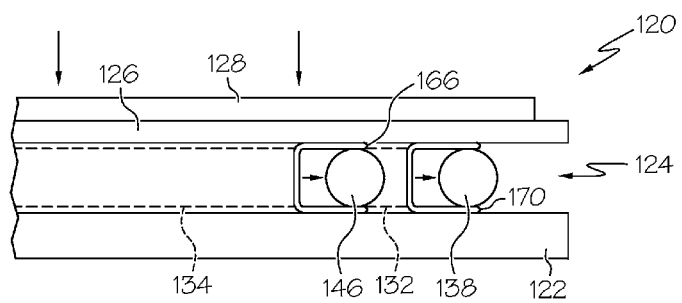

Referring to FIGS. 8-12, as the sensor support 126 is moved towards the base 122, the second arm 134 rotates relative to the first arm 132 about the pivot point 160 and 162 (FIG. 4). The rotation causes the arms 132 and 134 become less "crossed" and more "aligned" and "collapsed" as shown in FIGS. 8, 10, and 12. As shown specifically in FIGS. 9 and 10, as the sensor support 126 moves towards the base 122, the end portions 136 and 144 of the arms 132 and 134 that are connected to the sensor support 126 and the base 122 by the pivot brackets 164 and 168 rotate (or pivot). Specifically, end portion 136 does not slide across the sensor support 126, and end portion 144 does not slide relative to the base 122.

As shown in FIGS. 11 and 12, as the sensor support 126 moves towards the base 122, the end portions 138 and 146 of the arms 132 and 134 that are connected to the sensor support 126 and the base 122 by the slide brackets 166 and 170 slide within the brackets 166 and 170. Specifically, end portion 138 slides across the base 122 (within the bracket 170), and end portion 146 slides across the sensor support 126 (within the bracket 166). Although not shown, end portions 138 and 146 may also experience some rotation as the sensor support 126 moves towards the base 122.

As is apparent in FIGS. 8, 10, and 12, the scissor mechanism 124 and the switch 130 may be configured such that the sensor support 126 may be depressed so far as to completely collapse the scissor mechanism 124. That is, in one embodiment, the scissor mechanism 124 is configured to be able to "lie flat," as the end portions 144 and 146 of the second arm 134 may be positioned directly between the end portions 136 and 138 of the first arm 132. Such a feature may be facilitated by the second arm 134 being smaller than the first arm 132 and the pivot points 160 and 162 not being equidistant from the ends of the arms. When the scissor mechanism 124 is completely collapsed, the sensor support 126 may be suspended a second height 174 (FIG. 8) above the base 122. The second height 174 may be between 0.5 and 2.0 mm and correspond to the thicknesses of the first and second arms 132 and 134 (of the scissor mechanism 124 (i.e., respective first and second thickness which may be substantially equal) and the height of the switch 130 when actuated (e.g., when the dome portion is collapsed).

Because of the arrangement of the scissor mechanism 124, the sensor support 126 moves towards the base in a substantially "uniform" manner. That is, having the end portions of each of the arms 132 and 134 fixed relative to the sensor support 126 and the base 122, and yet still able to rotate, while allowing the opposing end portions to slide, minimizes any tilting and/or sliding experienced by the sensor support 126. Additionally, because of the arms 132 and 134 span across nearly the entire length and/or width of the sensor support 126, the amount of twisting (i.e., rotation about an axis perpendicular to the touch sensor 128) experienced by the sensor support 126 is reduced. Of particular interest is that this sort of uniform motion occurs regardless of where on the touch sensor 128 the force is applied (e.g., in the middle vs. along an edge). It should also be noted that the uniformity of the motion is facilitated by the "non-overlapping" arrangement of the brackets 164, 166, 168, and 170.

When the user releases or lifts the input object from the touch sensor 128, the switch 130 reflects the sensor support 126 and causes it to return to the position shown in FIG. 7. This movement may also be substantially uniform, as little or no twisting, tilting, or sliding may be experienced, for the same reasons as those described above with respect to the sensor support 126 moving towards the base 122.

A sensor device is provided that comprises an array of capacitive sensing electrodes and a processing system coupled to the electrodes. The capacitive sensing electrodes are configured to generate sensing signals that are indicative of objects in a sensing region. The processing system is configured to receive sensing signals from the capacitive sensing electrodes and generate a plurality of sensing values, each of the plurality of sensing values corresponding to a sensing electrode in the first array of capacitive sensing electrodes. The processing system is further configured to produce a plurality of positional values corresponding to a plurality of groups of electrodes in the first array of capacitive sensing electrodes; analyze the plurality of positional values to determine if one or more clusters exist in the plurality of positional values; and determine a number of objects in the sensing region from the determined one or more clusters in the plurality of positional values. Thus, the sensor device facilitates the determination of the number of objects in the sensing region, and can thus be used to facilitate different user interface actions in response to different numbers of objects.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device assembly comprising:
   a base;
   a touch sensor; and
   a scissor mechanism positioned between the base and the touch sensor and configured such that the touch sensor is moveable towards the base in a substantially uniform manner that substantially prevents tilting of the touch sensor with respect to the base, the scissor mechanism comprising:
   a first arm comprising first and second end portions and first and second side portions interconnecting the first and second end portions, the first end portion of the first arm being rotatably mounted to the base, the second end portion of the first arm being slidable relative to the touch sensor, wherein the first and second end portions of the first arm are separated by a first distance; and
   a second arm rotatably coupled to and positioned between the first and second side portions of the first arm, the second arm comprising first and second end portions and first and second side portions interconnecting the first and second end portions, the first end portion of the second arm being rotatably mounted to the base, and the second end portion of the second arm being slidable relative to the touch sensor, wherein the first and second end portions of the second arm are separated by a second distance, the second distance being less than the first distance,
   wherein the second arm of the scissor mechanism is rotatably coupled to the first arm of the scissor mechanism at a pivot, and deflection of the touch sensor causes the first end portion of the first arm to rotate relative to the base, the second end portion of the first arm to slide relative to the touch sensor, the first end portion of the second arm to rotate relative to the base, the second end portion of the second arm to slide relative to the touch sensor, and actuation of a switch mounted to the base, wherein the first arm completely surrounds the second arm upon deflection of the touch sensor.

2. The input device of claim 1, wherein the first and second arms of the scissor mechanism are sized and shaped such that sufficient deflection of the touch sensor causes the first and second end potions of the second arm to be positioned directly between the first and second end portions of the first arm.

3. The input device of claim 2, wherein the pivot is not equidistant from the first and second end portions of the first arm, and the pivot is not equidistant from the first and second end portions of the second arm.

4. The input device of claim 1, wherein the first and second arms of the scissor mechanism circumscribe the switch.

5. The input device of claim 2, wherein the first arm has a first thickness, the second arm has a second thickness, and the second thickness is substantially equal to the first thickness.

6. The input device of claim 1, wherein the switch is configured to exert a force opposing the deflection of the touch sensor.

7. The input device of claim 2, wherein the pivot is equidistant from the first and second end portions of the first arm, and the pivot is equidistant from the first and second end portions of the second arm.

8. The input device of claim 7, wherein the touch sensor comprises:
   the switch;
   a plurality of sensor electrodes configured to sense user input in a sensing region; and
   a processor coupled to the switch and the plurality of sensor electrodes, the processor configured to determine actuation of the switch and positional information associated with the user input in the sensing region.

9. The input device of claim 1, further comprising a plurality of brackets interconnecting the base, the touch sensor, and the first and second arms of the scissor mechanism.

10. An input device assembly comprising:
    a base;
    a touch sensor;
    a switch positioned between the base and the touch sensor and mounted to the base; and
    a scissor mechanism positioned between the base and the touch sensor, the scissor mechanism configured such that the touch sensor is moveable towards the base in a substantially uniform manner that substantially prevents tilting of the touch sensor with respect to the base, the scissor mechanism comprising:
    a first arm comprising first and second end portions and first and second side portions interconnecting the first and second end portions, wherein the first end portion of the first arm is rotatably mounted to the base, the second end portion of the first arm is slidable relative to the touch sensor, and the first and second end portions of the first arm are separated by a first distance; and
    a second arm comprising first and second end portions and first and second side portions interconnecting the first and second end portions, wherein the first side portion of the second arm is rotatably coupled to the first side portion of the first arm, the second side portion of the second arm is rotatably coupled to the second side portion of the first arm, and the first and second side portions of the second arm are positioned between the first and second side portions of the first arm, and wherein the first end portion of the second arm is rotatably mounted to the base, and the second end portion of the second arm is slidable relative to the touch sensor, and wherein the first and second end portions of the second arm are separated by a second distance, the second distance being less than the first distance, wherein the second arm of the scissor mechanism is rotatably coupled to the first arm of the scissor mechanism at a pivot, and deflection of the touch sensor causes the first end portion of the first arm to rotate relative to the base, the second end portion of the first arm to slide relative to the touch sensor, the first end portion of the second arm to rotate relative to the base, the second end portion of the second arm to slide relative to the touch sensor, and actuation of the switch, wherein the first arm completely surrounds the second arm upon deflection of the touch sensor.

11. The input device of claim 10, wherein the first side portion of the second arm is rotatably coupled to the first side portion of the first arm at a first pivot, and the second side portion of the second arm is rotatably coupled to the second side portion of the first am at a second pivot.

12. The input device of claim 11, wherein the first and second pivots are not equidistant from the first and second end portions of the first arm, and the first and second pivots are not equidistant from the first and second end portions of the second arm.

13. The input device of claim 12, further comprising a plurality of brackets interconnecting the base, the touch sensor, and the first and second arms of the scissor mechanism, wherein the plurality of brackets are configured to allow the rotation of the first end portion of the first arm, the slidability of the second end portion of the first arm, the rotation of the first end portion of the second arm and the slidability of the second end portion of the second arm.

14. The input device of claim 10, wherein the scissor mechanism is configured to exert a force opposing the deflection of the touch sensor.

15. A method of providing an input device assembly, the method comprising:
    providing a base;
    providing a touch sensor; and
    interconnecting the base and the touch sensor with a scissor mechanism positioned between the base and the touch sensor, wherein the scissor mechanism is configured such that the touch sensor is moveable towards the base in a substantially uniform manner that substantially prevents tilting of the touch sensor with respect to the base, the scissor mechanism comprising:
        a first arm comprising first and second end portions and first and second side portions interconnecting the first and second end portions, the first end portion of the first arm being rotatably mounted to the base, the second end portion of the first arm being slidable relative to the touch sensor, wherein the first and second end portions of the first arm are separated by a first distance; and
        a second arm rotatably coupled to and positioned between the first and second side portions of the first arm, the second arm comprising first and second end portions and first and second side portions interconnecting the first and second end portions, the first end portion of the second arm being rotatably mounted to the base, and the second end portion of the second arm being slidable relative to the touch sensor, wherein the first and second end portions of the second arm are separated by a second distance, the second distance being less than the first distance,
    wherein the second arm of the scissor mechanism is rotatably coupled to the first arm of the scissor mechanism at a pivot, and deflection of the touch sensor causes the first end portion of the first arm to rotate relative to the base, the second end portion of the first arm to slide relative to the touch sensor, the first end portion of the second arm to rotate relative to the base, the second end portion of the second arm to slide relative to the touch sensor, and actuation of a switch mounted to the base, wherein the first arm completely surrounds the second arm upon deflection of the touch sensor.

16. The method of claim 15, wherein the touch sensor comprises:
    a plurality of sensor electrodes configured to sense user input in a sensing region; and
    a processor coupled to the plurality of sensor electrodes, the processor configured to determine positional information associated with the user input in the sensing region.

17. The method of claim 15, further comprising providing a plurality of brackets interconnecting the base, the touch sensor, and the first and second arms of the scissor mechanism, wherein the plurality of brackets are configured to allow the rotation of the first end portion of the first arm, the slidability of the second end portion of the first arm, the rotation of the first end portion of the second arm and the slidability of the second end portion of the second arm.

18. The method of claim 16, further comprising providing the switch, the switch being positioned between the base and the touch sensor and configured to exert a force opposing the deflection of the capacitive touch sensor, and wherein the processor is coupled to the switch and further configured to detect actuation of the switch.

19. The method of claim 15, wherein the first side portion of the second arm is rotatably coupled to the first side portion of the first arm at a first pivot, and the second side portion of the second arm is rotatably coupled to the second side portion of the first arm at a second pivot, and wherein the first and second pivots are not equidistant from the first and second end portions of the first arm, and the first and second pivots are not equidistant from the first and second end portions of the second arm.

* * * * *